(12) United States Patent
Allen (10) Patent No.: US 8,707,108 B1
(45) Date of Patent: Apr. 22, 2014

(54) DETECTING MEMORY FAILURES IN COMPUTING SYSTEMS

(75) Inventor: Nicholas Alexander Allen, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 260 days.

(21) Appl. No.: 13/355,359

(22) Filed: Jan. 20, 2012

(51) Int. Cl.
*G06F 11/00* (2006.01)

(52) U.S. Cl.
USPC ........................................... 714/47.3

(58) Field of Classification Search
USPC ............... 714/25–33, 37, 38.1, 38.11, 39, 42, 714/47.2, 47.3, 48
See application file for complete search history.

(56) References Cited

U.S. PATENT DOCUMENTS

| | | | |
|---|---|---|---|
| 7,325,106 B1 * | 1/2008 | Dmitriev et al. ............... | 711/159 |
| 8,504,878 B2 * | 8/2013 | Otenko ........................... | 714/42 |
| 8,539,454 B2 * | 9/2013 | Havin ............................ | 717/130 |
| 2004/0172579 A1 * | 9/2004 | Fu .................................. | 714/47 |
| 2007/0033365 A1 * | 2/2007 | Vaidyanathan et al. ....... | 711/170 |
| 2009/0070630 A1 * | 3/2009 | Khatri et al. .................. | 714/37 |
| 2011/0138367 A1 * | 6/2011 | Havin ............................ | 717/130 |
| 2011/0276949 A1 * | 11/2011 | Otenko ........................... | 717/131 |
| 2013/0132699 A1 * | 5/2013 | Vaishampayan et al. ..... | 711/170 |

* cited by examiner

*Primary Examiner* — Nadeem Iqbal
(74) *Attorney, Agent, or Firm* — Knobbe Martens Olson & Bear, LLP (57) ABSTRACT

Systems and methods for the analysis of memory information of a computing device are provided. One or more user computing devices may transmit memory information to a memory analysis system. The memory analysis system may generate a weighted object graph based on the received memory information, and identify subgraphs to inspect for potential memory use patterns. If such patterns are common in an identified subgraph, they may indicate a potential memory leak. The memory analysis system may further analyze a larger portion of the weighted object graph based on a detected common pattern. Each detected pattern may be ranked based on the likelihood that it corresponds to a memory leak.

22 Claims, 6 Drawing Sheets

DETECTING MEMORY FAILURES IN COMPUTING SYSTEMS

BACKGROUND

Generally described, computing programs executed by a computing device may require some amount of temporary storage space for holding data or other information during execution. As such, computing devices may provide dynamically allocatable memory space for use by these programs during execution. This memory space may correspond to, for example, random access memory (RAM) or other memory configured to provide dynamically allocatable space (e.g., paging memory or swap memory).

During execution, computing programs may request and be allocated portions of memory space for their use (e.g., to store program data). Generally, once the stored data is no longer needed, programs may release the memory, such that it may be made available for other uses. However, in some situations, memory allocated to a computer program may fail to be deallocated or properly released, even when the information contained within memory is no longer useful or accessible. These situations may, for example, be a result of an error within the computer code corresponding to the program. As a result, less memory may then be available to the computing device or programs executing on the computing device. This lack of memory may result in adverse effects, such as decreased performance of the computing system and program or system crashes.

Further, computing systems may utilize a communication network, or a series of communication networks, to exchange data. In some instances, computing programs, such as those described above, or information may be transferred over such communication networks.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Generally described, aspects of the present disclosure relate to analyzing memory information of a computing system in order to identify potential errors in the memory management of a computer program. These errors may correspond to instances where a computer program is allocated memory of a computing device, but fails to return all or a portion of such memory for de-allocation. In some instances, such portions of memory may be inaccessible to the computer program, and therefore may reduce memory availability of the computing device. As used herein, a failure of a computer program to return or deallocate a portion of memory of a computing system may be referred to as a memory leak. Specifically, systems and methods are disclosed which facilitate transmission of memory information from a user computing device to a memory analysis system. The memory analysis system may then identify potentially likely memory leaks of programs executing on the user computing devices ("target program").

Illustratively, the memory analysis system may be associated with one or more memory information collection modules. Each memory information collection module may be executed by a user computing device, and may gather information regarding the memory use of the user computing device. In some embodiments, this memory information collection module may be operable to collect information regarding memory use of a target program associated with the operator of a memory analysis system. For example, the operator or another party associated with the memory analysis system may provide target programs that generally run on a user computing device. In order to detect potential memory leaks in such target programs the operator may transmit, with the consent of the user, a memory information collection module to the user computing device. Such a memory information collection module may then collect information regarding memory use of the target programs, and transmit that memory information back to the operator. If a memory leak is detected within the target program, the operator may alter the target program before providing it to additional user computing devices.

In some embodiments, a target program may correspond to a program executed within a limited execution environment of a user computing device (e.g., within a web browser). For example, a target program may be implemented via JavaScript. Alternatively, target programs may be executed in a general execution environment (e.g., an operating system or other execution environment). In some embodiments, a user computing device may initially receive such a target program from an entity associated with the memory analysis system (e.g., via a communication network). In these embodiments, the memory information collection module may be transmitted along with the target program.

In some embodiments, the memory information collection module may be given access to low level memory information, such as direct access to inspect all or a portion of memory of a user computing device. In other embodiments, the memory information collection module may be configured to estimate memory usage of a target program without requiring direct access to memory of the user computing device. As will be described in more detail below, a memory information collection module may estimate memory use of a target program by iteratively following references within a program to a number of objects and estimating the memory use of each field within an object. Based on this information, the memory use of the target program as a whole may be estimated. This memory use information may then be transmitted to the memory analysis system.

Further, in some embodiments, memory information corresponding to a specific target program may be gathered from many user computing devices. By analyzing information from a variety of user computing devices executing a target program under a variety of conditions, the accuracy of detection of a memory leak may be improved.

Based on the received memory information, memory use of a target program may then be analyzed to determine potential memory leaks. Illustratively, a reference graph may be constructed which includes each object generated by a target program and additional information regarding each object. Based on this reference graph, a weighted object graph may be constructed which reflects the objects used by a target program, the size of each object in memory of a user computing device, and references between these objects.

In order to analyze such a weighted object graph, a number of patterns of memory use may be identified in the weighted object graph. These patterns may be generally referred to herein as motifs. Each motif may correspond to an exact pattern of objects within a weighted object graph, or to a generalized pattern of objects (e.g., within a given range of characteristics). Generally, a memory leak results in the generation of multiple instances of a given motif within memory. Therefore, the likelihood that any given motif corresponds to a memory leak is at least partially correlated to the frequency of the motif in the weighted memory graph. In addition, other characteristics of a motif may indicate that the motif corresponds to a memory leak. Though described in more detail below, these characteristics may include, without limitation, the thread which created, modified, or last accessed objects within instances of a motif, the time of creation of instances of a motif, and the memory location of instances of a motif. Based on analysis of these characteristics, motifs which are most likely to represent memory leaks may be identified, ranked, and presented to an operator of a memory analysis system. The operator may then verify that the motif represents a memory leak and correct the target program if necessary.

In some instances, analysis of an entire weighted object graph may be facilitated by generating a number of subgraphs of the weighted object graph. These subgraphs may be separately analyzed to identify motifs within the subgraph. Due to the decreased size of a subgraph relative to the overall weighted memory graph, motifs may be more quickly identified. In addition, analysis of subgraphs may take place concurrently in order to take advantage of parallel processing techniques. Each subgraph may be analyzed in a manner similar to that described above with respect to a weighted object graph in order to identify potential motifs. Thereafter, motifs identified based on subgraphs may be used in analysis of the overall weighted graph, and ranked as described above.

Specific embodiments and example applications of the present disclosure will now be described with reference to the drawings. These embodiments and example applications are intended to illustrate, and not limit, the present disclosure.

Figure 1:
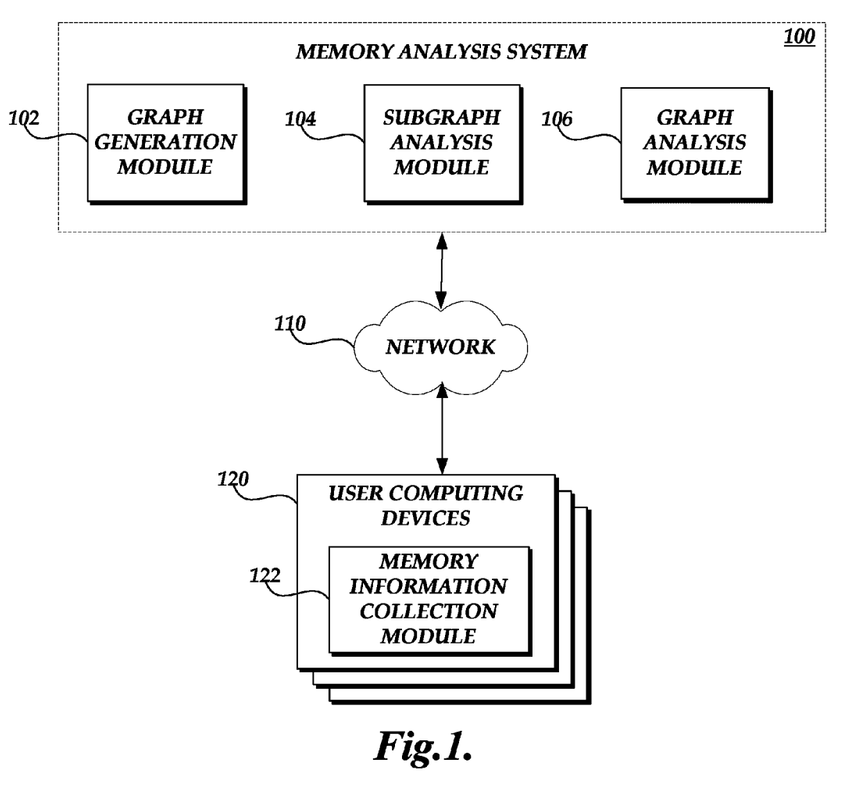
FIG. 1 is a block diagram illustrating an embodiment of a memory analysis system and one or more user computing devices.

FIG. 1 is a block diagram illustrating an embodiment of a memory analysis system 100 including a graph generation module 102, a subgraph analysis module 104, and a graph analysis module 106. In this illustrative embodiment, the memory analysis system is in communication with a number of user computing devices 120 via a network 110. Each user computing device further includes a memory information collection module 122.

As described above, a memory information collection module, such as memory information collection module 122, may inspect the memory use of one or more programs (e.g., target programs) executing or previously executed on the user computing device 120. As will be described in more detail below with respect to FIG. 2, in some embodiments, the memory information collection module 122 may collect information directly from a memory of the user computing device 120. In other embodiments, the memory information collection module 122 may estimate memory information based on the structure of the target program.

The memory analysis system 100 may utilize memory information collected from one or more user computing devices 120 to detect memory leaks caused by target programs executing on the user computing devices 120. As described above, in some instances, target programs may be associated with an operator of the memory analysis system. In these instances, information regarding potential memory leaks of the target programs may be utilized by the operator of the memory analysis system in order to correct errors within the target programs.

As shown in FIG. 1, the memory analysis system 100 includes a graph generation module 102, a subgraph analysis module 104, and a graph analysis module 106. Though shown separately for the purposes of this disclosure, in some embodiments, each of these modules may be combined with one or more other modules without affecting the functionality of the memory analysis system 100. Further, the memory analysis system 100 may include additional modules not shown in FIG. 1 while remaining within the scope of this disclosure. In some embodiments, the memory analysis system 100 may be implemented by a single computing device. In other embodiments, the memory analysis system 100 may be implemented by a number of computing devices in communication with one another. In some embodiments, the computing device or devices may correspond to physical computing devices. In other embodiments, the computing devices or devices may correspond to virtual machine instances implemented by one or more physical computing devices. In still other embodiments, computing devices may correspond to both virtual computing devices and physical computing devices.

Further, each of the graph generation module 102, the subgraph analysis module 104, and the graph analysis module 106 may be embodied in one or more virtual or physical computing devices. In some embodiments, each of the graph generation module 102, the subgraph analysis module 104, and the graph analysis module 106 may be embodied by separate computing devices. In other embodiments, two or more of the graph generation module 102, the subgraph analysis module, and the graph analysis module 106 may be embodied at least in part by the same computing device.

Illustratively, the graph generation module 102 may generate a weighted object graph based on memory information received from a user computing device 120. In some embodiments, the graph generation module 102 may first generate a reference graph from the received memory information. Generally speaking, a reference graph may include information such as each known object within a target program, the fields within each object, and the connections between objects. One illustrative example of a reference graph will be described in more detail with reference to FIG. 3A, below. In other embodiments, a reference graph may be generated by the memory information collection module 122 and transmitted to the graph generation module 102 via the network 110. Based on a reference object graph, the graph generation module 102 may generate a weighted object graph. A weighted object graph may include a representation of each object of a target program executed by a user computing device 120, as well as the estimated or actual memory use of each object. Further, the weighted object graph may include representations of the connections between such objects. One illustrative example of a weighted object graph will be discussed in more detail with respect to FIG. 3B, below.

As also shown in FIG. 1, the memory analysis system 100 includes a subgraph analysis module 104. The subgraph analysis module 104 may receive a weighted object graph generated by the graph generation module 102 and identify one or more memory use motifs based on analysis of portions of the weighted object graph. As used herein, the term motif generally refers to a pattern of memory use within a weighted object graph. These motifs may be analyzed against a weighted object graph to determine the likelihood that the motif is indicative of a memory leak. Though motifs may correspond to an exact pattern of memory use, in some instances, a single motif may apply to multiple similar patterns of memory use. For example, the characteristics of one or more nodes of a portion of a weighted memory graph may be altered, but the portion of the weighted memory graph may still correspond to the motif. Illustratively, the subgraph analysis module 104 may determine a number of subgraphs of the weighted object graph for analysis, and identify a number of motifs within each subgraph that may constitute a memory leak. The subgraph analysis module 104 may further rank the motifs based on the likelihood that they represent a memory leak.

The illustrative memory analysis system 100 of FIG. 1 further includes a graph analysis module 106, which may analyze the weighted object graph based on motifs received from the subgraph analysis module 104. Illustratively, the graph analysis module may determine the frequency of occurrence of each received motif in the weighted object graph. Based on this frequency, the graph analysis module 104 may determine the likelihood that each motif represents a memory leak in the weighted object graph. The process by which the weighted object graph is analyzed to determine the likelihood that each motif is a memory leak will be described in more detail with respect to FIG. 4, below. Based on the determined likelihood, the motifs may be ranked and prepared for output to an operator of the memory analysis system. In some embodiments, low ranking motifs or motifs that fall under a threshold likelihood may be removed from this output. Based on the output motifs, an operator of the memory analysis system may further investigate each motif with respect to the target program to determine whether a memory leak may exist.

Figure 2:
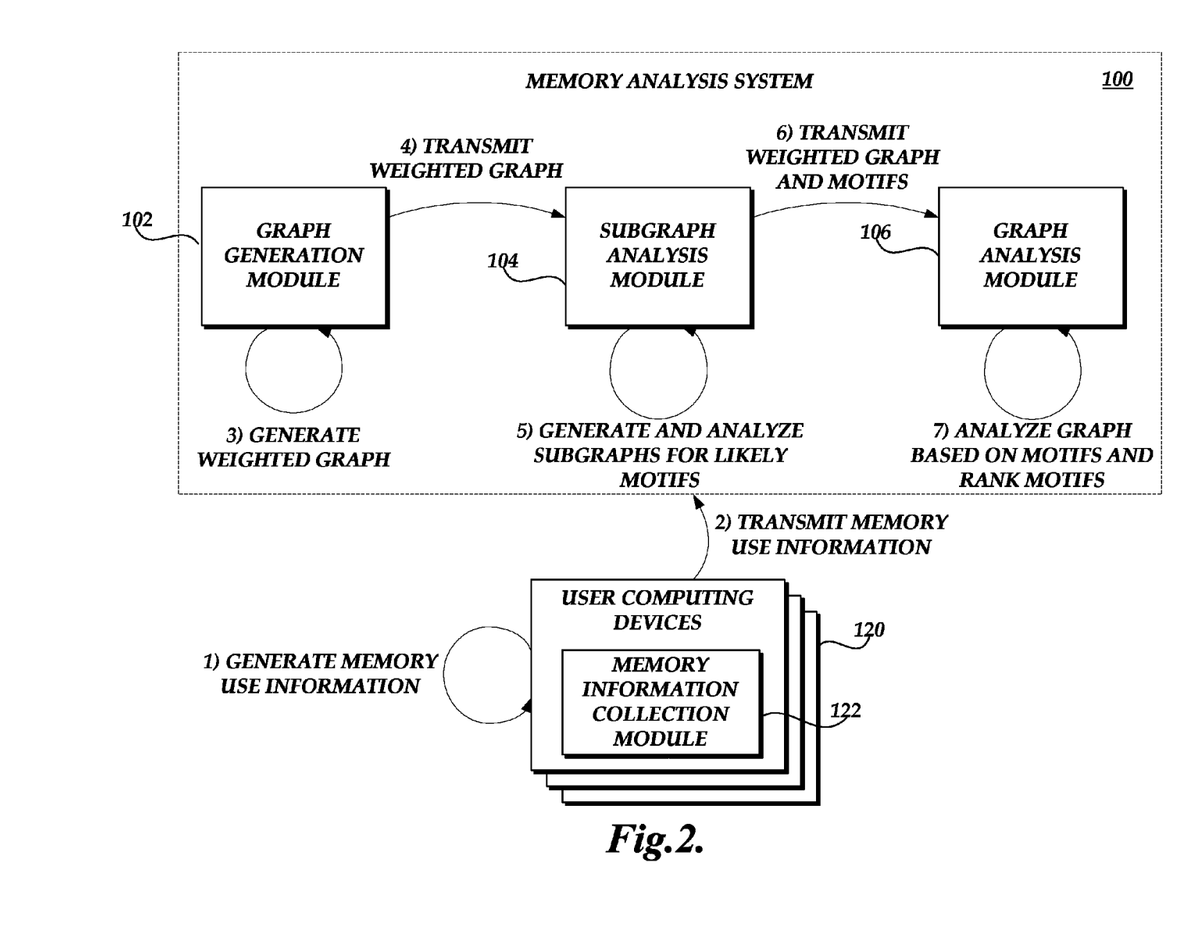
FIG. 2 is a simplified block diagram of the memory analysis system and user computing devices of FIG. 1 illustrating the analysis of memory information to detect potential memory leaks.

With reference to FIG. 2, a simplified block diagram is shown illustrating the collection and analysis of memory information of one or more user computing devices 120 of FIG. 1. As shown in FIG. 2, at (1), a memory information collection module 122 may generate memory use information based on inspecting the memory of the user computing device 120. In some embodiments, the memory information collection module 122 may have direct access to some or all memory information of the user computing device 120. In these embodiments, the memory information collection module 122 may collect memory information directly from memory of the user computing device 120 and transmit the memory information via the network 110 to the memory analysis system 100. In other embodiments, the memory information collection module 122 may not require direct access to memory information of the user computing device 120. For example, the memory information collection module 122 may estimate the memory use of a target program by analyzing objects and fields of the target program and estimating the memory use of each object and field.

As used herein, an object may refer to any collection of related information that is stored within a consecutive section of memory. Illustratively, an object may refer to a variable, function, or data structure defined within computer code of a target program. Within memory, an object may include a number of fields. These fields may correspond to data stored within memory (e.g., an integer field, a boolean field, or a character field). Further, these fields may correspond to pointers, links, or references to additional objects (e.g., a pointer to a class, structure, or array object). In general, whether a data type constitutes a field within an object or an object in itself may be somewhat dependent on the programming language used to construct a target program. For example, in some programming languages, a string data type may constitute a field within an object which resides within the memory space of the object. In other programming languages, implementing a string data type within a first object may cause creation of a string object which is separate in memory from the first object. In this example, the first object would then include a reference, link, or pointer to the string object. In either case, as will be described below in more detail, the memory information of a target program may be estimated by determining both the connections between objects of a target program in memory as well as the size of each object in memory, as represented by the collective size of all fields of the object. In this manner, the memory information collection module 122 may be able to execute in and collect memory information of target programs in environments that would not normally allow direct access to memory. For example, such environments may include executing via other programs, such as a web browser of the user computing device 120.

Illustratively, the memory information collection module 122 may estimate the memory information of a target program by identifying a number of root objects of a target program. These root objects may serve as starting points for identifying the memory use of the target program. In some embodiments, the target program may be modified to identify candidate root objects to the memory information collection module. After identifying such root objects, the memory information collection module 122 may estimate the memory use of that root object by estimating the size of each field of the root object. For example, the memory information collection module may determine that an object is composed of two int type data fields, one boolean type data field, and four pointer fields, each of which points to an additional object. Based on the architecture of the user computing device and the operating environment of the target program, the memory information collection module may determine that each specific data type data field should occupy a certain memory space (e.g., int may occupy 32 bits, boolean may occupy 1 bit, etc). As used herein, fields of an object include any data type within a target program, including both primitive and non-primitive data types. Primitive data types include but are not limited to byte, short, int, long, float, double, boolean, char, and pointers. By aggregating the estimated sizes of each field of an object, the memory information collection module 122 may estimate the size of the object in memory. In addition, the memory information collection module 122 may identify and analyze other objects based on the fields within a root object. For example, a root object may contain a number of primitive field types, as well as a number of pointers or links to other objects. Based on these pointers, the memory information collection module 122 may analyze those other objects. By repeatedly following such pointers, the memory information collection module 122 may collect information regarding the memory use of any object accessible by the root objects.

In some embodiments, the memory information collection module 122 may be configured to gather memory information at points when a target program is least likely to be using large amounts of information. Under these conditions, it may be more likely that recurring patterns of memory use indicate a memory leak. In addition, gathering memory information at low points of operation may reduce the information that needs to be transmitted and analyzed.

After generation by the user computing device 120, the memory use information may, at (2), be transmitted to the memory analysis system 100. After receiving the memory information, the memory analysis system 100 may utilize memory information collected from one or more user computing devices 120 to detect memory leaks caused by target programs executing on the user computing devices 120. As described above, in some instances, target programs may be associated with an operator of the memory analysis system 100. In these instances, information regarding potential memory leaks of the target programs may be utilized by the operator of the memory analysis system 100 in order to correct errors within the target programs.

Illustratively, the graph generation module 102 may, at (3), generate a weighted object graph based on memory information received from a user computing device 120. In some embodiments, the graph generation module 102 may first generate a reference graph from the received memory information. Generally speaking, a reference graph may include information such as each known object within a target program, the fields within each object, and the connections between objects. One illustrative example of a reference graph will be described in more detail with reference to FIG. 3A, below. In other embodiments, a reference graph may be generated by the memory information collection module 122 and transmitted to the graph generation module 102 via the network 110.

In some embodiments, a target program may be modified to include additional information regarding some or all objects in memory. For example, each object within a target program may include annotations indicating the type of the object. Illustratively, an object which corresponds to the general type "string" may include an annotated type "PasswordString." In some embodiments, these annotated types may be preferred to non-annotated types, and may be used to identify objects with higher accuracy.

With continued reference to FIG. 2, based on a reference object graph, the graph generation module 102 may generate a weighted object graph at (3). A weighted object graph may include a representation of each object of a target program executed by a user computing device 120, as well as the estimated or actual memory use of each object. Further, the weighted object graph may include representations of the connections between such objects. In some embodiments, the weighted object graph may be modified based on the requirements of the memory analysis system 100. For example, some references between objects that exist within a reference graph may be discarded when constructing a weighted object graph. Illustratively, references may be dropped when they are insufficient to protect an object from being collected by a garbage collector or other automated memory management system. Because such references have little or no effect on memory management of a user computing device 120, these references may in some instances be of less value in detecting potential memory leaks. These references may be referred to by various terms based on the operating environment of a target program, but may include, without limitation, weak references, soft references, and phantom references. One illustration or representation of a weighted object graph will be described in more detail with respect to FIG. 3B, below. After generation, the weighted object graph may be transmitted to the subgraph analysis module 104 at (4).

The subgraph analysis module 104 may receive a weighted object graph generated by the graph generation module 102 and identify one or more memory use patterns based on analysis of portions of the weighted object graph. Illustratively, the subgraph analysis module 104 may generate, at (5), a number of subgraphs of the weighted object graph for analysis. Each subgraph may constitute a number of interconnected objects of the weighted object graph. For example, the subgraph analysis module 102 may randomly select a seed object within the weighted object graph and inspect each other object connected to the seed object. The resulting portion of the weighted object graph may constitute a subgraph for analysis. In some embodiments, the subgraph analysis module 104 may bias selection of the seed object based on characteristics of the seed object. For example, the chance of selection of each seed object may be based on the size of the seed object, such that objects that use a higher amount of memory are more likely to be selected as seed objects. In some embodiments, the subgraph analysis module 104 may further modify the subgraph by removing objects from the subgraph based on characteristics of the object, such as the time the object was created, how the object was created, the memory use of the object, or other characteristics. Generation of subgraphs will be described in more detail with respect to FIG. 5, below.

With continued reference to (5), once a number of subgraphs have been selected by the subgraph analysis module 104, the subgraph analysis module 104 may analyze each subgraph for potential motifs that may be indicative of a memory leak. Illustratively, these motifs may be determined based on the composition of each subgraph. For example, the subgraph analysis module 104 may inspect each subgraph to detect any pattern that is repeated a threshold number of times. Each of these patterns may constitute a motif. In some embodiments, the subgraph analysis module 104 may prioritize analysis of motifs with a higher number of repetitions.

Each motif may be comprised of a number of interconnected objects sharing certain characteristics. For example, a motif may consist of an object of type A of a certain size connected to two objects of type B of a certain size. By inspecting the generated subgraph, the subgraph analysis module 104 may determine the likelihood that the selected motif constitutes a memory leak. Generally speaking, a memory leak is generally represented by a pattern or a number of similar patterns occurring multiple times within memory. As such, if a motif is observed repeatedly throughout a subgraph of memory, it is more likely to represent a memory leak. For example, if a subgraph selected by the subgraph analysis module 104 consists nearly entirely of a particular motif, that pattern may be highly likely to constitute a memory leak.

Generally described, the likelihood of a motif constituting a memory leak may correspond to the data compression ratio that results from compressing a subgraph based on the motif. Illustratively, if a motif were to be selected that encompasses the entirety of a subgraph (e.g., the motif and the subgraph are identical), the data compression ratio that results from compressing the subgraph in terms of the motif would be quite low. Put in other terms, because the subgraph and the pattern are equivalent, it is equally difficult to describe the subgraph in terms of the motif as it is to describe the subgraph alone. As such, the motif would not likely constitute a memory leak. As a further example, if a motif is less than the entirety of a subgraph, but occurs only once within a subgraph, the resultant data compression ratio would be equally low. However, if a motif recurs multiple times within a subgraph, representation of the subgraph may be made simpler by defining the motif and then representing the subgraph in terms of the motif. Illustratively, a motif may consist of a collection of three interconnected objects of a type A. A subgraph may consist of three interconnected instances of this motif. Without reference to the motif, representation of the subgraph would require description of each of the nine interconnected objects. With reference to the motif, representation of the subgraph requires only that the subgraph consists of three of a specific motif, where the motif is three objects. The amount of data needed to represent a subgraph is thus reduced from nine objects (each individual object of 9 objects) to six (three instances of the motif, where the motif is 3 objects). Because a better data compression ratio is obtained when compressing the subgraph based on the motif, the motif is of a higher likelihood to represent a memory leak.

After determining a number of motifs that may represent memory leaks, the subgraph analysis module 104 may rank the motifs based on the likelihood that they represent a memory leak. Such likelihood may be based, for example, on the frequency of occurrence of the pattern within analyzed subgraphs, or on the timing, size, type, or other characteristics of the pattern or objects within the pattern. Ranking of motifs will be described in more detail with respect to FIG. 5, below. These ranked motifs may then be transmitted to a graph analysis module 106.

The graph analysis module 106 may, in turn, analyze the weighted object graph based on the motifs received from the subgraph analysis module at (7). Illustratively, the graph analysis module 106 may determine the frequency of occurrence of each received motif in the weighted object graph. Based on this frequency, the graph analysis module 106 may determine the likelihood that each motif represents a memory leak in the weighted object graph. This likelihood may be further altered by characteristics of the motif, such as the types of objects within the motif, the time or times at which instances of the motif or were created, and various other characteristics. The process by which the weighted object graph is analyzed to determine a likelihood that each motif is a memory leak will be described in more detail with respect to FIG. 4, below. Based on the determined likelihood, the motifs may be ranked and prepared for output to an operator of the memory analysis system. In some embodiments, low ranking motifs or motifs that fall under a threshold likelihood may be removed from this output. Based on the output motifs, an operator of the memory analysis system may further investigate each motif with respect to the target program to determine whether a memory leak may exist.

Though described above with respect to a single user computing device 120, in some embodiments, memory information may be gathered from a number of user computing devices 120. Motifs generated from each user computing device 120 may be compared in order to identify those motifs which likely correspond to memory leaks. For example, if a motif is identified in a single user computing device 120 as likely corresponding to a memory leak, but is not identified by any other user computing devices 120, it may be less likely to correspond to an actual memory leak. Conversely, if multiple user computing devices 120 identify a motif as a likely memory leak, it may be more likely to correspond to an actual memory leak.

Figure 3A:
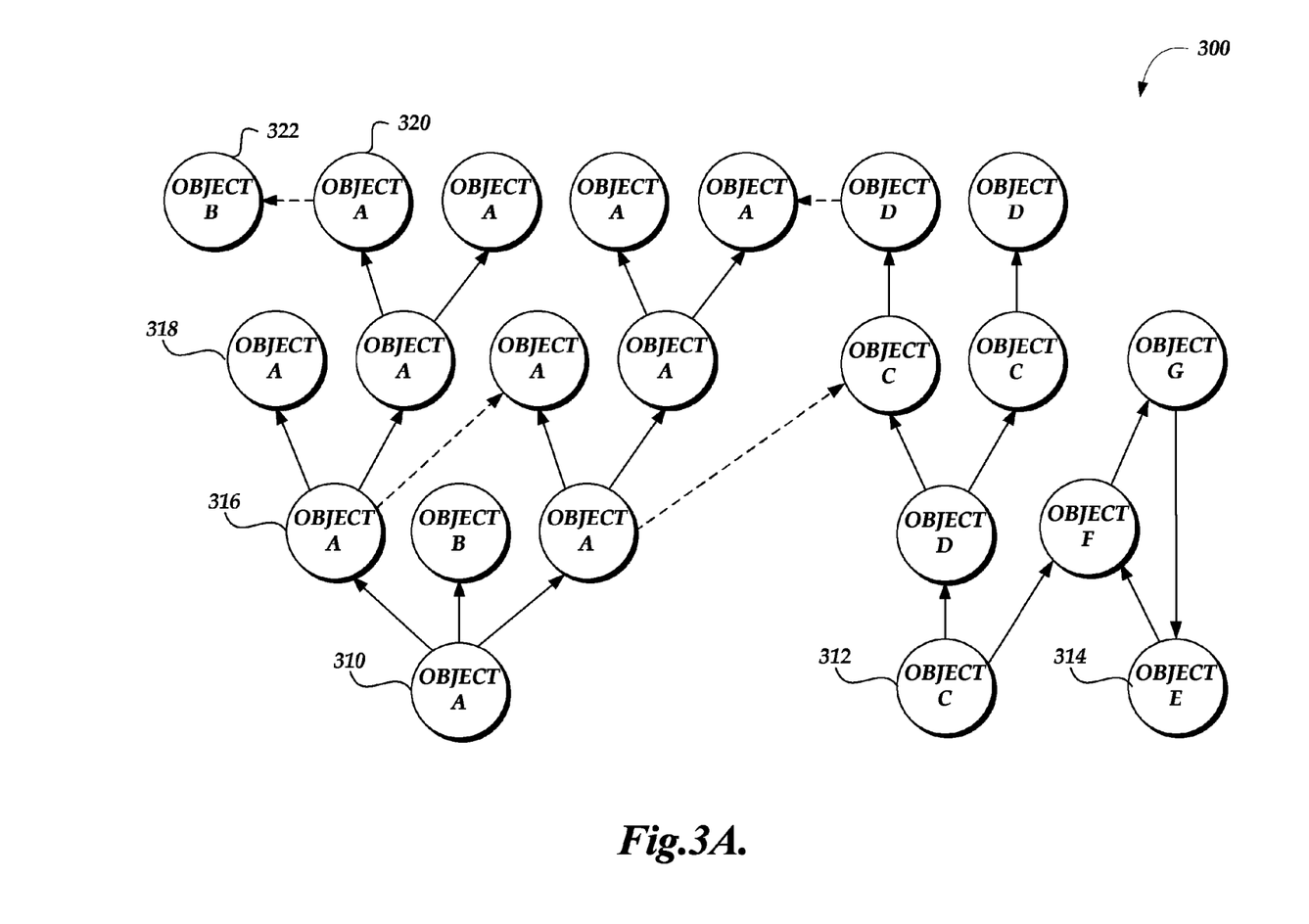
FIG. 3A is an illustrative graphical representation or visualization of a reference memory graph corresponding to memory information of a user computing device of FIG. 1.

FIG. 3A is an illustrative graphical representation or visualization of a reference graph 300 corresponding to memory information collected from a user computing device, such as a user computing device 120 of FIG. 1. Illustratively, the reference graph 300 may be generated by the graph generation module 102 of a memory analysis system 100, or may be generated by a memory information collection module 122. As shown in FIG. 3A, the memory reference graph includes a number of objects interconnected by references, links, or pointers. Each object further includes an object type (e.g., types A-G). As described above, in some embodiments, target programs may be modified to annotate objects with more specific type information. In these embodiments, the object types may be reflective of these annotation types. In instances where objects are not annotated, the object types may correspond to the data type of the object within the target program. These data types may include, but are not limited to, struct, class, string, and array. Further, these data types may include custom data types defined by the target program.

In the illustration of FIG. 3A, three root objects 310, 312, and 314 form the roots of the reference graph 300. As described above, in some embodiments, a reference graph may be generated by inspecting objects referenced by each root object, then inspecting objects referenced by those secondary objects, and continuing until all objects are located. For example, root object 310 references object 316, which in turn references object 318. In this example illustration, general or strong references are depicted by solid lines ending in a pointer. The direction of the pointer is indicative of the direction of the reference within the target program. References that are not sufficient to protect an object from deallocation within memory are depicted by dashed lines. Illustratively, these may correspond to weak, soft, or phantom references within the corresponding computer code of the target program. For example, object 320 weakly references object 322, and as such, this reference is depicted as a dashed line. As described above, each object may be associated with other objects, and may contain fields that correspond to primitive or non-primitive data types. In addition, each object may be associated with additional information not depicted in FIG. 3A, such as the identity of the thread that created the object, the time of creation, or additional characteristics.

In this example illustration, a number of objects of type A are shown. For the purposes of this example, objects of type A may be associated with a recursive function (e.g., each instance of an object of type A may create one or more additional instances of an object of type 'A'). This recursive function may be associated with a memory leak, such that on at least some occasions, an object of type A is not removed from memory after it has completed its corresponding function. As such, a large portion of the illustrative reference graph displayed in FIG. 3A corresponds to objects of type A.

Though the reference graph 300 of FIG. 3A is limited in the number of objects it contains, a reference graph may include any number of objects. In practice, a reference graph may include thousands, tens of thousands, or hundreds of thousands of objects. As will be appreciated by one of ordinary skill in the art, the size of the reference graph may vary based on the size of the target program to which the graph corresponds.

Figure 3B:
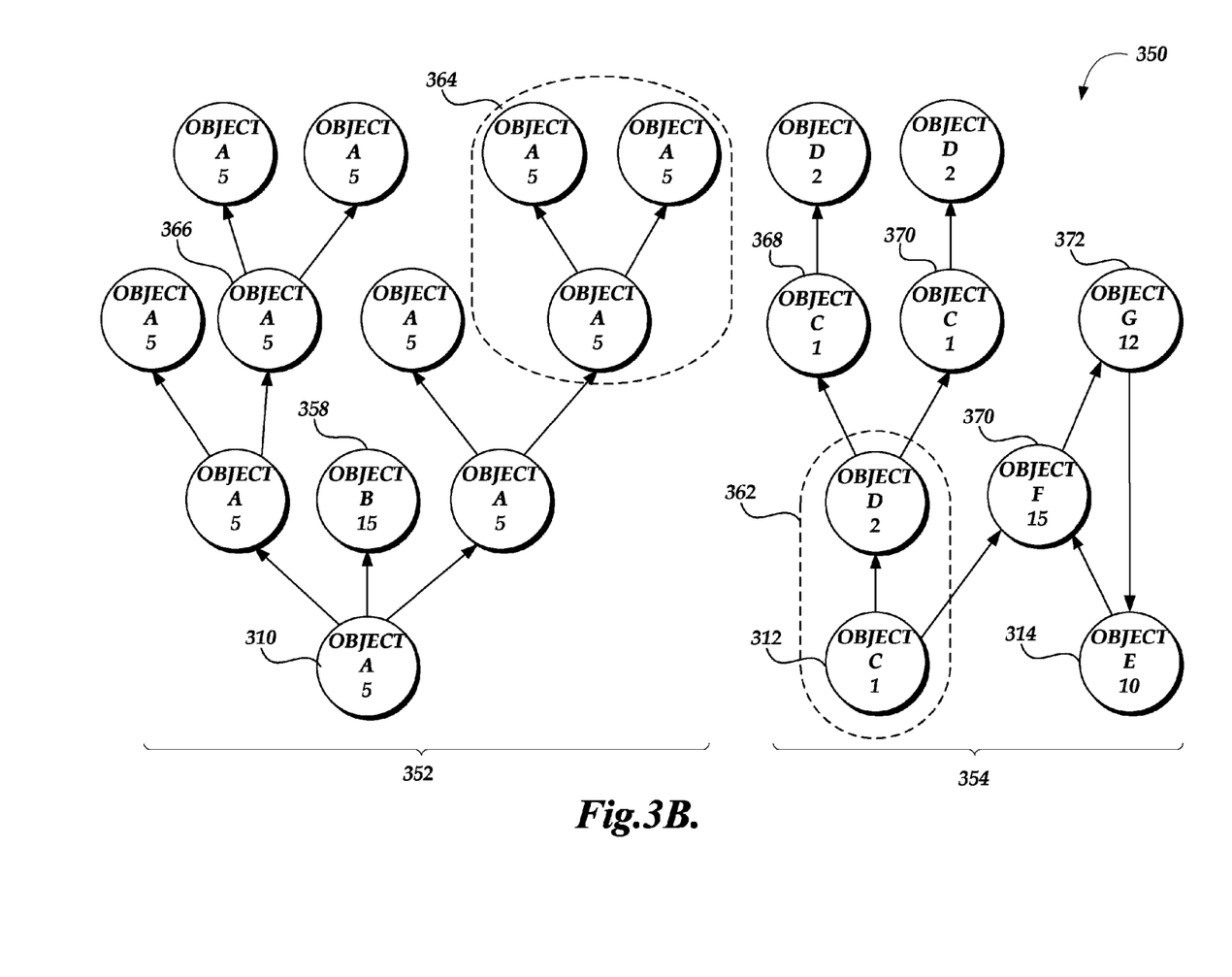
FIG. 3B is an illustrative graphical representation or visualization of a weighted object graph corresponding to the reference memory graph of FIG. 3A.

Based on the characteristics of objects in reference graph 300, a weighted object graph 350 may be generated based on the reference graph, as is shown in FIG. 3B. In this illustrative representation, weak references existing within the reference graph 300 have been discarded and removed from the weighted object graph. In addition, objects that were only accessible via such weak references have been removed. For example, object 322 of FIG. 3A has been removed from the weighted object graph. In addition, each remaining object with the weighted object graph has been inspected and labeled with a weight. In this example, the weight of each object within the weighted object graph corresponds to the actual or estimated memory usage of all fields within the object. For example, object 310 has been assigned a weight of 5. This weight may be reflective of the memory use of pointers to other objects, such as object 358, and the memory use of any other fields within object 310 (e.g., data fields).

In addition, FIG. 3B depicts two potential subgraphs 352 and 354 that may be selected by a subgraph analysis module, such as subgraph analysis module 104 of FIG. 1. As shown in FIG. 3B, after removal of weak references, subgraphs 352 and 354 are no longer connected. Though shown for illustrative purposes, a memory analysis module 104 may determine that any number of subgraphs exist within the weighted object graph 350. For example, where subgraphs are limited to a specified number of objects, a memory analysis module 104 may generate multiple subgraphs from weighted memory graph 350, each subgraph containing no more than the specified number of objects.

Further, FIG. 3B depicts two potential motifs 364 and 362 which may be representative of memory leaks within the target program analyzed to create the weighted object graph 350. As shown in FIG. 3B, motif 364 includes three objects of type A of weight 5. Specifically, the motif 364 includes a first node of type A and weight 5 that references two additional nodes of type A and weight 5. With respect to subgraph 352, motif 364 can be seen to be repeated multiple times. For example, object 366 also corresponds to a node of type A and weight 5 that references two nodes of type A and weight 5. Still further, root object 310 corresponds to a node of type A and weight 5 that references two nodes of type A and weight 5. In fact, with the exception of nodes which reference no objects, each node of subgraph 352 corresponds to a node of type A and weight 5 that references two nodes of type A and weight 5.

Similarly, motif 362 is repeated multiple times within subgraph 354. Motif 362 corresponds to an object of type C and weight of 1 that references a single object of type D and weight 2. As can be seen in FIG. 3B, nodes 368 and 370 also correspond to an object of type C and weight of 1 that references a single object of type D. However, the nodes 314, 370 and 372 cannot be described in terms of the motif 362. As such, the motif 362 partially (though not completely) describes subgraph 354, and may represent a memory leak. Illustratively, subsequent to analyzing a motif with respect to each subgraph, the motifs may be analyzed with respect to the entire weighted object graph. In this example, because motif 364 is more successful at describing the entirety of the weighted object graph than motif 362, motif 364 may be identified as more likely to represent a memory leak.

Figure 4:
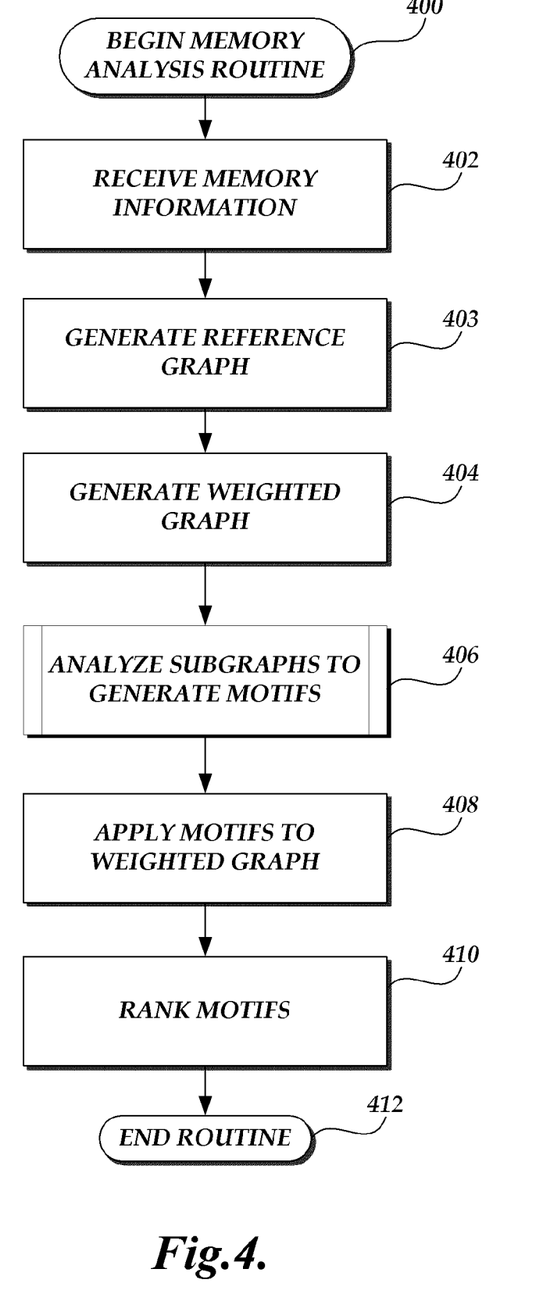
FIG. 4 is a flow diagram depicting an illustrative routine for analyzing memory information of a user computing device, such as a user computing device of FIG. 1, in order to detect potential memory leaks.

With reference now to FIG. 4, an illustrative flow-diagram depicting a routine 400 for analyzing received memory information. This routine may be carried out by, for example, a memory analysis system 100 of FIG. 1. At block 402, the memory analysis system 100 may receive memory information corresponding to at least one target program executed on a user computing device 120.

At block 403, the memory analysis system 100 may generate a reference graph based on the received memory information. In some embodiments, a graph generation module 102 may be used to generate such a reference graph. In other embodiments, a reference graph may be constructed by the user computing device 120 and transmitted to the memory analysis system 100. In such embodiments, block 403 of the routine 400 may be skipped.

As described above, a reference graph, such as reference graph 300 of FIG. 3A, may correspond to a representation of all objects of a target program or target programs as well as the references between those objects. A reference graph may therefore be generated by inspecting each object within the received memory information and each corresponding reference to another object. In some embodiments, the reference graph may include additional information regarding each object. For example, characteristics of each object may be included that might be helpful to determine whether the object is indicative of a memory leak. These characteristics include, but are not limited to, the size of the object, the thread of a target program that created or modified the object, and the time of creation or last modification of the object. As described above, in some embodiments, objects may include annotations that serve to identify the object for the purposes of analysis. In some embodiments, a reference graph may include such annotations.

At block 404, a weighted object graph may be generated based on the reference graph. As described above, a weighted object graph may correspond to a modified reference graph in which each object is weighted according to the memory use of the object. One example of a weighted object graph is described above with respect to FIG. 3B. A weighed object graph may be further modified in order to remove extraneous or unhelpful information. For example, references of a reference graph that are not sufficient to protect an object from garbage collection within a target program may be removed. In addition, objects that are only accessible via such references (e.g., weak, soft, or phantom references) may be removed from the weighted object graph. Still further, in some embodiments, objects may be explicitly removed from the weighted object graph based on characteristics of those objects. For example, where annotations are included that identify types of objects, specific annotation types may be removed from the weighted object graph. These types may correspond to administrative functions or any other function or object that an operator of the memory analysis system 100 does not wish to be included in memory analysis.

After generation of a weighted object graph, at block 406, a number of subgraphs of the weighted object graph may be analyzed to determine motifs that potentially indicate a memory leak. As will be described in more detail below with respect to FIG. 5, a number of subgraphs may be generated based on the weighted object graph, and each subgraph may be inspected for common motifs. These motifs may then be ranked according to their frequency within subgraphs and other characteristics of the motif.

At block 408, motifs identified by block 406 may be applied to the weighted subgraph in order to determine a likelihood that the motif is indicative of a memory leak. Because each motif has been previously identified as being included in at least one subgraph, it is somewhat likely that the motif will occur commonly in the weighted object graph as a whole. By analyzing motifs with respect to subgraphs prior to analyzing them with respect to the weighted object graph as a whole, the time required to analyze a weighted object graph may be reduced. Further, in some embodiments, analyzing individual subgraphs prior to analyzing the entire weighted object graph may allow use of parallel processing techniques to improve the speed of memory analysis.

In order to identify whether an individual motif is indicative of a memory leak, the motif may be compared to the entirety of the weighted object graph. Generally, if a motif corresponds to a memory leak, the motif should occur within the weighted object graph multiple times. As such, the likelihood that a motif corresponds to a memory leak is at least partially dependent on the number of times the motif occurs within the weighted object graph. As described above, in some embodiments, a motif may correspond to an exact pattern of memory use. However, in other embodiments, a motif may correspond to a generalized pattern of memory use, such that different combinations of objects may correspond to the same motif. For example, each characteristic of an object within a motif may correspond to a range of values. Illustratively, a motif may include an object of a size 1 through 3, of a type A or B, or a combination of the two. One of ordinary skill in the art will appreciate that a motif may include any number of characteristics and ranges of values. In still more embodiments, some characteristics may not be required in order to match a given motif. For example, an object that meets 4 of 5 target characteristics of a motif may still be said to match the motif.

At block 410, the identified motifs may be ranked according to their likelihood of corresponding to a memory leak. Though the frequency of occurrence of a motif is one indication of the likelihood that the motif represents a memory leak, in some embodiments, other characteristics of motifs may also be indicative of a likelihood of a memory leak. These characteristics include, but are not limited to, the length of time a motif exists within memory, the difference in time between creation of multiple motifs, the thread by which each motif was created, and the location within the weighted memory graph of each motif. For example, where all occurrences of a motif were created by the same thread at a similar time, the motif may be indicative of a recursive function under normal operation, rather than a memory leak. Conversely, where motifs exist for long periods of time and are created at different time periods, they may be indicative of a memory leak. Still further, the point of execution of a target program may influence the likelihood that a motif indicates a memory leak. For example, a program in the middle of a busy point of execution may be more likely to include a number of similar motifs (e.g., from a heavily used function). However, a program at a slow point in execution is likely to have very little memory use. As such, a frequently reoccurring motif at this point is likely to correspond to a memory leak. Based on analyzing the motifs according to one or more of these characteristics, the motifs may be ranked. High ranking motifs may then be inspected by an operator of the memory analysis system 100 to determine whether the motif indicates a memory leak, and if so, to correct the leak. Thereafter, at block 412, the routine 400 may end.

Figure 5:
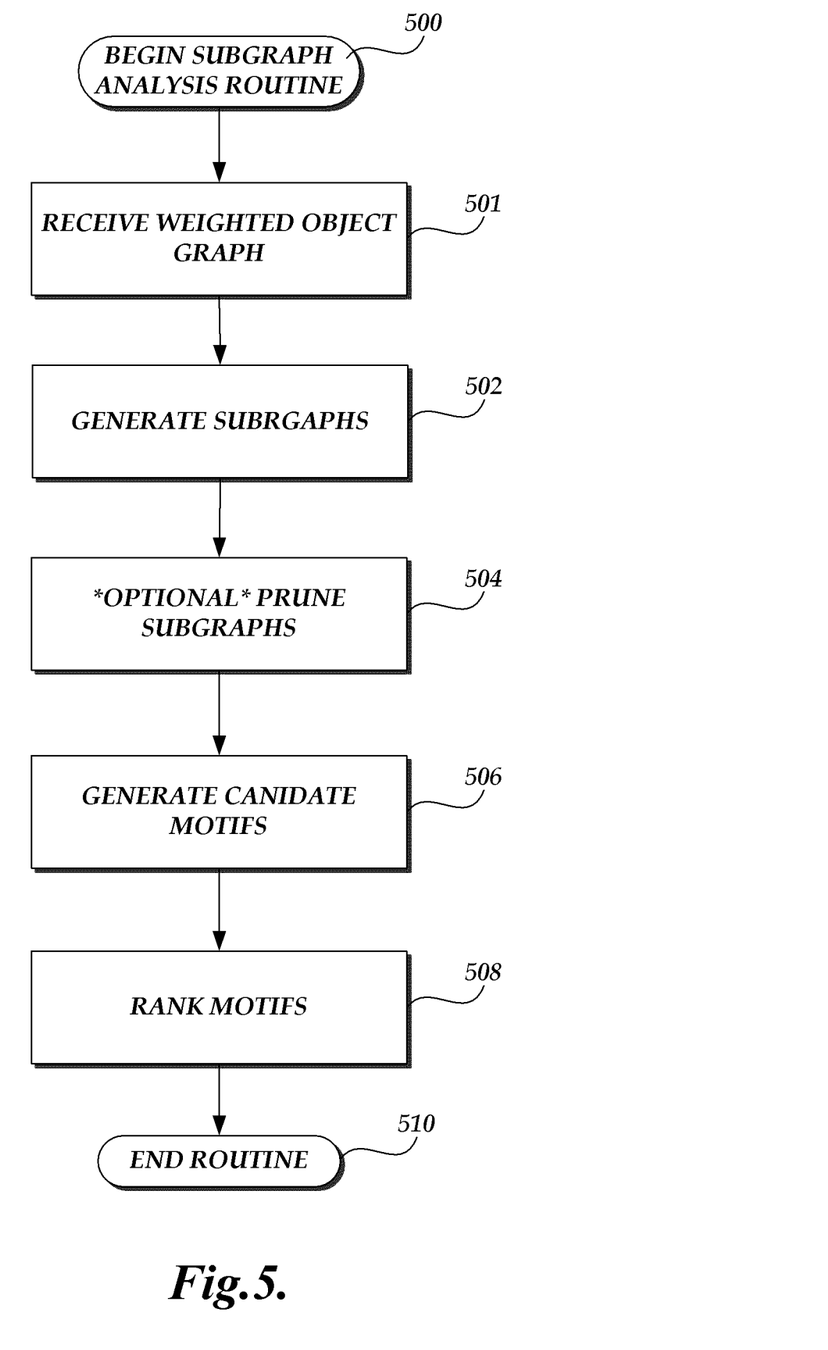
FIG. 5 is a flow diagram depicting an illustrative routine for generating and analyzing subgraphs of a weighted object graph corresponding to memory information of a user computing device, such as a user computing device of FIG. 1.

FIG. 5 is a flow diagram depicting an illustrative routine 500 for generating and analyzing subgraphs of a weighted object graph. Such a routine may be carried out, for example, by a subgraph analysis module 104 of FIG. 1. Further, such a routine may correspond to block 406 of FIG. 4.

At block 501, the subgraph analysis module 104 receives a weighted object graph. As described above, a weighted object graph may correspond to a number of objects interconnected via references to other objects. Each object may be weighted based on the memory use of the object within a target program. Further, the weighted object graph may include information corresponding to additional characteristics of each object, such as the time of creation or modification of the object or the thread which created or last modified the object.

At block 502, a number of subgraphs are generated based on the weighted object graph. Illustratively, each subgraph may correspond to a portion of the weighted object graph. Some examples of subgraphs are described above with respect to FIG. 3B. In order to generate a subgraph, the subgraph analysis module 104 may select a number of seed objects within a weighted object graph at random. Thereafter, the subgraph analysis module 104 may follow each reference either pointing to or from the seed object to another object. The subgraph analysis module 104 may continue to follow references until all objects accessible from the seed object are located. The portion of the weighted object graph corresponding to these accessible objects may then constitute a subgraph. In some embodiments, thresholds for the maximum or minimum size of a subgraph may be specified. For example, a subgraph may only be considered for analysis if it includes some n number of objects, or some n total size of objects. Further, generation of a subgraph may cease after some n number of objects or some n total size of objects has been encountered. Thus, it may be appreciated that multiple different subgraphs may exist within a single connected component of the weighted object graph. The different subgraphs may be disjoint or even partially overlapping depending on the sizes of the subgraphs and the locations of the seed objects. If a desired number of subgraphs are not reached, the subgraph analysis module 104 may continue to select seed objects and attempt to generate subgraphs. In some embodiments, the random selection of seed objects may be biased based on the characteristics of the objects. For example, objects higher in size may be selected with greater frequency than smaller objects. In addition, seed objects may be selected such that they represent diverse characteristics (e.g., a diversity of creating thread, time of creation, time of modification, etc.).

Optionally, at block 504, the subgraph analysis module 104 may prune the selected subgraphs according to the characteristics of the objects within the subgraph. Illustratively, a number of objects of the subgraph may be removed if it is unlikely they are indicative of a memory leak. Such characteristics of objects may include, but are not limited to, the thread which created or last modified the object, the size of the object, and the location in memory of the object.

At block 506, a number of motifs are generated from each subgraph. Each motif may be generated based on the characteristics of the subgraph. As described above, a motif may correspond to an exact pattern of objects in memory, or a generalized pattern. Illustratively, each motif may be generated based on the existence of a threshold number of instances of the motif within the subgraph. In some embodiments, the subgraph analysis module 104 may select objects at random as motif seeds, and follow references to and from the seed object to a certain distance in order to create a test motif. This motif may then be tested against the subgraph to determine whether any additional instances of the motif exist within the subgraph. In some embodiments, additional motifs may be generated based on motifs that have a high frequency within the subgraph. For instances, the subgraph analysis module 104 may generate a number of similar motifs to a common motif, and test the subgraph for inclusion of the similar motifs. Motif generation may proceed iteratively until generated motifs are no longer commonly found within the subgraph.

At block 508, each generated motif may be ranked according to the likelihood that the motif corresponds to a memory leak. As described above with respect to the entirety of a weighted graph, this likelihood may correspond to the frequency of a motif in a subgraph and to additional characteristics of the motif or instances of the motif. These characteristics include, but are not limited to, the length of time a motif instance exists within memory, the difference in time between creation of multiple motif instances, the thread by which each motif instance was created, and the location within the weighted memory graph of each motif instance. Still further, the point of execution of a target program may influence the likelihood that a motif indicates a memory leak. Based on analyzing the motifs according to one or more of these characteristics, the motifs may be ranked. High ranking motifs may then, for example, be passed to a graph analysis module (such as graph analysis module 106 of FIG. 1) for analysis against an entire weighted object graph. Such analysis is described in more detail above with respect to FIG. 4.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for identifying potential failures to deallocate memory by a target program, the method comprising:
    receiving, from at least one user computing device, memory information corresponding to memory use of a target program;
    generating, based on the received memory information, a weighted object graph, wherein the weighted object graph corresponds to a representation of a plurality of objects identified based on the received memory information, and wherein each object within the weighted object graph is weighted according to the portion of the received memory information which corresponds to the object;
    determining one or more patterns within the weighted object graph, each pattern corresponding to a collection of one or more objects within the weighted object graph;
    for each determined pattern, determining a frequency of the pattern within the weighted object graph; and
    ranking the determined one or more patterns based at least in part on the frequency of the pattern within the weighted object graph, wherein the rank of each pattern corresponds to a likelihood that the pattern is indicative of a failure to deallocate memory within the target program.

2. The computer-implemented method of claim 1, wherein ranking the determined patterns is further based at least in part on characteristics of objects within each determined pattern.

3. The computer-implemented method of claim 2, wherein characteristics of objects include at least one of: a time at which objects were created, modified, or accessed, a time between creation, access, or modification of objects, a thread that created, modified, or accessed the object, annotations on objects, or a location of objects within the weighted object graph.

4. The computer-implemented method of claim 1, wherein determining one or more patterns within the weighted object graph further comprises:
    determining a plurality of subgraphs of the weighted object graph, each subgraph corresponding to at least a portion of the weighted object graph; and
    for each subgraph:
        determining one or more patterns within the subgraph, each pattern corresponding to a collection of one or more objects within the subgraph;
        for each determined pattern, determining a frequency of the pattern within the subgraph; and
        ranking the determined one or more patterns within the subgraph based at least in part on the frequency of the pattern within the subgraph.

5. The computer-implemented method of claim 4, further comprising pruning at least one of the plurality of subgraphs based on characteristics of objects within the subgraph.

6. The computer-implemented method of claim 1, wherein the memory information is received from at least two computing devices.

7. The computer-implemented method of claim 1, wherein determining a frequency of the pattern includes determining a data compression ratio of the pattern and the weighted object graph.

8. A system for identifying potential memory leaks within a target program, the system comprising:
    at least one computing device configured to:
        generate, based on the received memory information, a weighted object graph, wherein the weighted object graph corresponds to a representation of a plurality of objects identified based at least in part on memory information received from one or more computing devices, and wherein each object within the weighted object graph is weighted according to the portion of the received memory information which corresponds to the object;
        determine one or more patterns within the weighted object graph, each pattern corresponding to a collection of one or more objects within the weighted object graph;
        for each determined pattern, determine a frequency of the pattern within the weighted object graph; and
        rank the determined one or more patterns based at least in part on the frequency of the pattern within the weighted object graph.

9. The system of claim 8, wherein ranking the determined patterns is further based at least in part on characteristics of objects within each determined pattern.

10. The system of claim 9, wherein characteristics of objects include at least one of: a time at which objects were created, modified, or accessed, a time between creation, access, or modification of objects, a thread that created, modified, or accessed the object, annotations on objects, or a location of objects within the weighted object graph.

11. The system of claim 8, wherein the rank of each pattern corresponds to a likelihood that the pattern is indicative of a failure to deallocate memory within the target program.

12. The system of claim 8, wherein the at least one computing device is further configured to:
- determine a plurality of subgraphs of the weighted object graph, each subgraph corresponding to at least a portion of the weighted object graph; and
- for each subgraph:
  - determine one or more patterns within the subgraph, each pattern corresponding to a collection of one or more objects within the subgraph;
  - for each determined pattern, determine a frequency of the pattern within the subgraph; and
  - rank the determined one or more patterns based at least in part on the frequency of the pattern within the subgraph.

13. The system of claim 8, wherein the weighted object graph is further based on a reference graph.

14. The system of claim 13, wherein the reference graph is received from the user computing device.

15. A computer-readable, non-transitory storage medium having computer-executable instructions for identifying potential memory leaks of a target program, the computer-executable instructions comprising instructions that upon execution by one or more computing systems cause the one or more computing systems to:
- receive, from the at least one user computing device, memory information corresponding to memory use of a target program;
- generate, based on the received memory information, an object graph;
- determine a frequency of one or more patterns within the object graph; and
- rank the one or more patterns based at least in part on the frequency of the pattern within the object graph.

16. The computer-readable, non-transitory medium of claim 15, wherein ranking the determined patterns is further based at least in part on characteristics of objects within each determined pattern.

17. The computer-readable, non-transitory medium of claim 15, wherein the computer-readable, non-transitory medium further comprises instructions that cause the one or more computing systems to:
- determine a plurality of subgraphs of the object graph, each subgraph corresponding to at least a portion of the object graph; and
- for each subgraph:
  - determine a frequency of one or more patterns within the subgraph; and
  - rank the one or more patterns based at least in part on the frequency of the pattern within the subgraph.

18. The computer-readable, non-transitory medium of claim 17, wherein the computer-readable, non-transitory medium further comprises instructions that cause the one or more computing systems to prune at least one of the plurality of subgraphs based on characteristics of objects within the subgraph.

19. The computer-readable, non-transitory medium of claim 15, wherein the memory information is received from at least two user computing devices.

20. The computer-readable, non-transitory medium of claim 15, wherein the object graph is further based on a reference graph.

21. The computer-readable, non-transitory medium of claim 20, wherein the reference graph is received from the user computing device.

22. The computer-readable, non-transitory medium of claim 15, wherein the rank of each pattern corresponds to a likelihood that the pattern is indicative of a failure to deallocate memory within the target program.

* * * * *